United States Patent [19]
Posthumus

[11] Patent Number: 5,333,799
[45] Date of Patent: Aug. 2, 1994

[54] BALE CUTTING MACHINE

[75] Inventor: Albert Posthumus, Stephenville, Tex.

[73] Assignee: A & P Mfg., Inc., Stephenville, Tex.

[21] Appl. No.: 15,149

[22] Filed: Feb. 9, 1993

[51] Int. Cl.$^5$ .................................. B02C 18/02
[52] U.S. Cl. ..................... 241/27; 241/101.7; 241/199.3; 241/605
[58] Field of Search ............ 241/101.7, 605, 199.3, 241/199.4, 27; 83/109, 276

[56] References Cited

U.S. PATENT DOCUMENTS

| | | | |
|---|---|---|---|
| 744,328 | 11/1903 | Frtschek . | |
| 1,445,051 | 2/1923 | Tasaka . | |
| 1,708,771 | 4/1929 | Noble . | |
| 3,385,336 | 5/1968 | Barnard . | |
| 3,741,051 | 6/1973 | Brooks et al. | 83/23 |
| 3,830,438 | 8/1974 | Garrison et al. | 241/283 |
| 3,920,190 | 11/1975 | Kanengieter et al. | 241/30 |
| 4,142,686 | 3/1979 | Houle | 241/101.7 |
| 4,163,524 | 8/1979 | Lundahl et al. | 241/30 |
| 4,227,654 | 10/1980 | Seefeld et al. | 241/34 |
| 4,258,886 | 3/1981 | Lundahl et al. | 241/101.7 |
| 4,518,124 | 5/1985 | Klinner et al. | 241/101.7 |
| 5,025,992 | 6/1991 | Niebur | 241/101.7 |
| 5,033,684 | 7/1991 | Von der Heide | 241/101.7 |
| 5,209,413 | 5/1993 | Dwyer et al. | 241/101.7 |
| 5,217,174 | 6/1993 | Martin et al. | 241/222 |

*Primary Examiner*—Mark Rosenbaum
*Assistant Examiner*—John M. Husar
*Attorney, Agent, or Firm*—Robert G. Boydston

[57] ABSTRACT

An apparatus and method for breaking down compressed bales of may or similar materials. The apparatus utilizes a canted bed mounted on wheels for movement as a trailer and a single blade knife spans the width of the bed between two cantilever mounted levers. The knife is activated by a pair of hydraulic cylinders to cut the bale into slices of widths controlled by an operator who advances the bales under the knife by controlling movement of a bale pusher actuated by a third hydraulic cylinder, with all three cylinders exchanging hydraulic oil under pressure with an external source, such as a farm tractor, through a control box. In operation bales are loaded into the lower end of the canted bed, advanced for cutting in the plane of the knife stroke by the hydraulic powered bale pusher, sliced transversely to the compressed layers by the hydraulic powered knife and discharged from a chute at the elevated end of the canted bed.

7 Claims, 4 Drawing Sheets

BALE CUTTING MACHINE

BACKGROUND OF THE INVENTION

1. Field of the Invention:

The present invention relates generally to machines for cutting compressed bales of fibrous material, and more particularly, to a machine for cutting hay bales down to pieces of convenient size for feeding and fodder mixing operations.

2. Description of the Related Art:

Modern hay baling machines create very large, tightly compressed bales. For livestock feeding the large bales are often broken down to manageable pieces by hand. Smaller pieces are also needed for introducing hay to fodder mixers, machines that, usually in a rotating drum, mix hay with feed grain and other dietary material to produce fodder.

Breaking down large compacted bales manually is difficult, time consuming work. Present machines known to perform the cutting down task include the inventor's DEVICE FOR CUTTING DOWN PRESSED COARSE FIBRE BALES SUCH AS HAY BALES, Netherlands Patent Application Number T-11. The machine of that invention is expensive to build and difficult to operate compared to the present invention. It is not easily made into a portable unit, often a desirable configuration of such a machine. An earlier manual device, U.S. Pat. No. 744,328 utilized a pivoted knife cutter for loose hay or straw but did not address compressed bales. Later devices address bale cutting with various arrays of reciprocating or rotary power driven blades, often serrated, toothed or composite, that require complex chain, belt or gear drive systems. See U.S. Pat. Nos. 3,385,336, 4,142,686, 4,227,654 and 5,025,992. None of these devices is as simple, efficient and versatile as the present invention.

Accordingly it is an object of the present invention to provide a reliable, economical machine for cutting fiber bales down to relatively small pieces.

It is another object to provide such a machine in an easily operated and portable configuration.

Yet another object is to provide such a machine that utilizes hydraulic power readily available from a common agricultural tractor.

Another object is to provide a bale cutting machine that provides for processing of both cylindrical (commonly called round) and rectangular (commonly called square) hay bales.

It is also an object of the invention to provide a bale cutting machine that utilizes a single, replaceable knife blade for cutting bales.

SUMMARY OF THE INVENTION

Briefly described, and in accordance with one embodiment thereof, the present invention relates to a machine for cutting down pressed fiber bales such as hay bales into smaller pieces of manageable size that can be, if desired, further broken down easily by hand before being processed in a fodder mixer or fed directly to livestock. A fabricated steel bed with opposed upright side walls, a powered bale pusher and a powered, cantilever mounted cutting knife with removable blade are the basic components of the preferred embodiment of the invention.

Hydraulic cylinders power the bale pusher and the cutting knife utilizing hydraulic power obtained from a common farm tractor. A bale loaded on the bed is moved under the cutting blade incrementally by the bale pusher as the cutting blade severs the bale transversely to the layers of compressed hay. A wheel mounted support frame under the fabricated steel bed makes the machine portable as a trailer.

DETAILED DESCRIPTION OF THE PREFERRED EMBODIMENT

Figure 1:
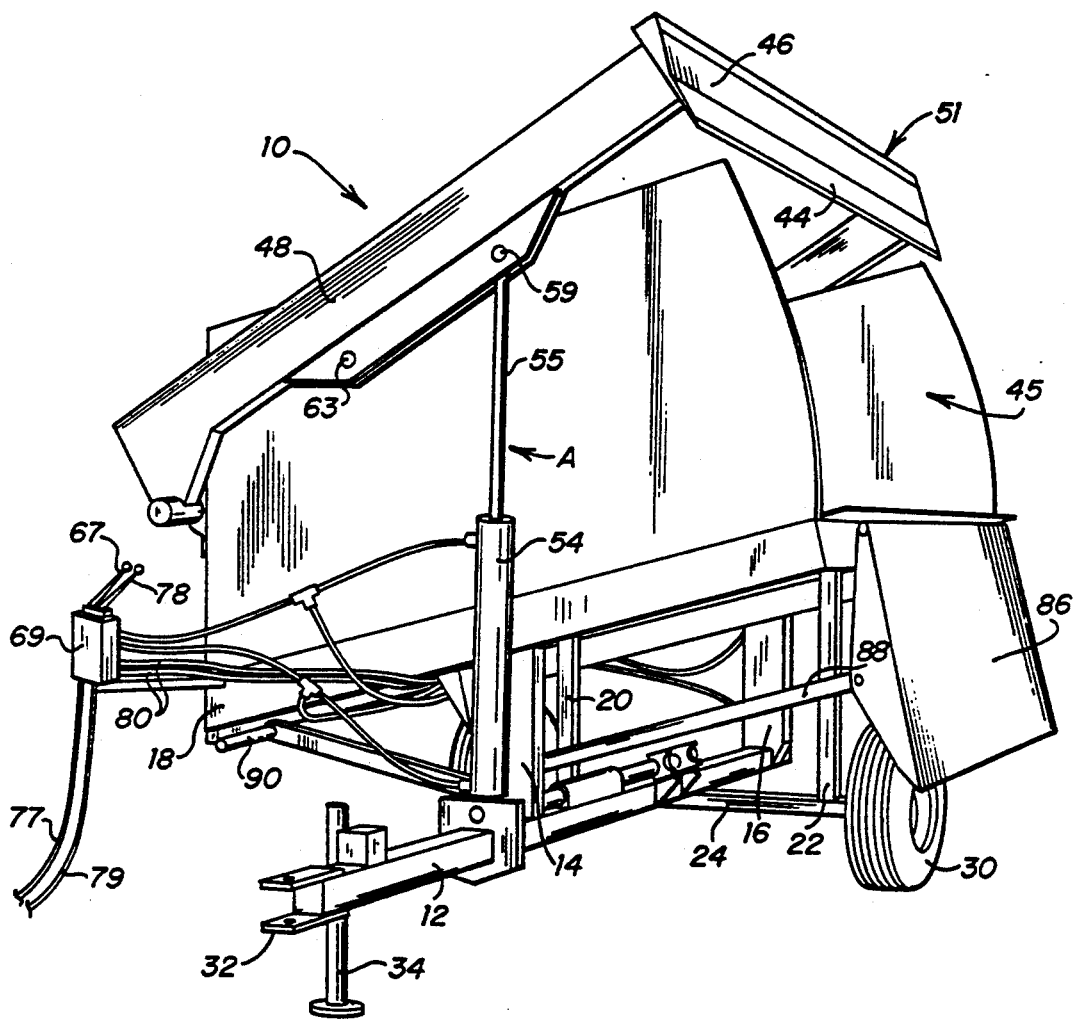
FIG. 1 is a perspective view of a bale cutting machine showing the operator control unit side, cutting knife and part of the undercarriage.

The bale cutting machine 10 of FIG. 1 is shown having a base support member 12 to which support stanchions 14 and 16 are rigidly affixed. A bed 18, usually of fabricated steel construction, rests on and is affixed to the tops of the stanchions 14 and 16. Additional bed support is provided by end vertical support members 20 and 22 that are each affixed at a lower end to base support cross member 24. For the embodiment shown the base support cross-member 24 also serves as an axle support member for carrying wheel axles 26 shown in FIG. 3 (counterpart axle on opposite end of crossmember 24 is not visible in the drawing) so the machine 10 can be made portable by the inclusion of wheel assemblies 28 and 30. To complete the portable trailer configuration of the machine 10 a trailer hitch pin connector 32 and hand jack stand 34 are attached to base support member 12.

Figure 2:
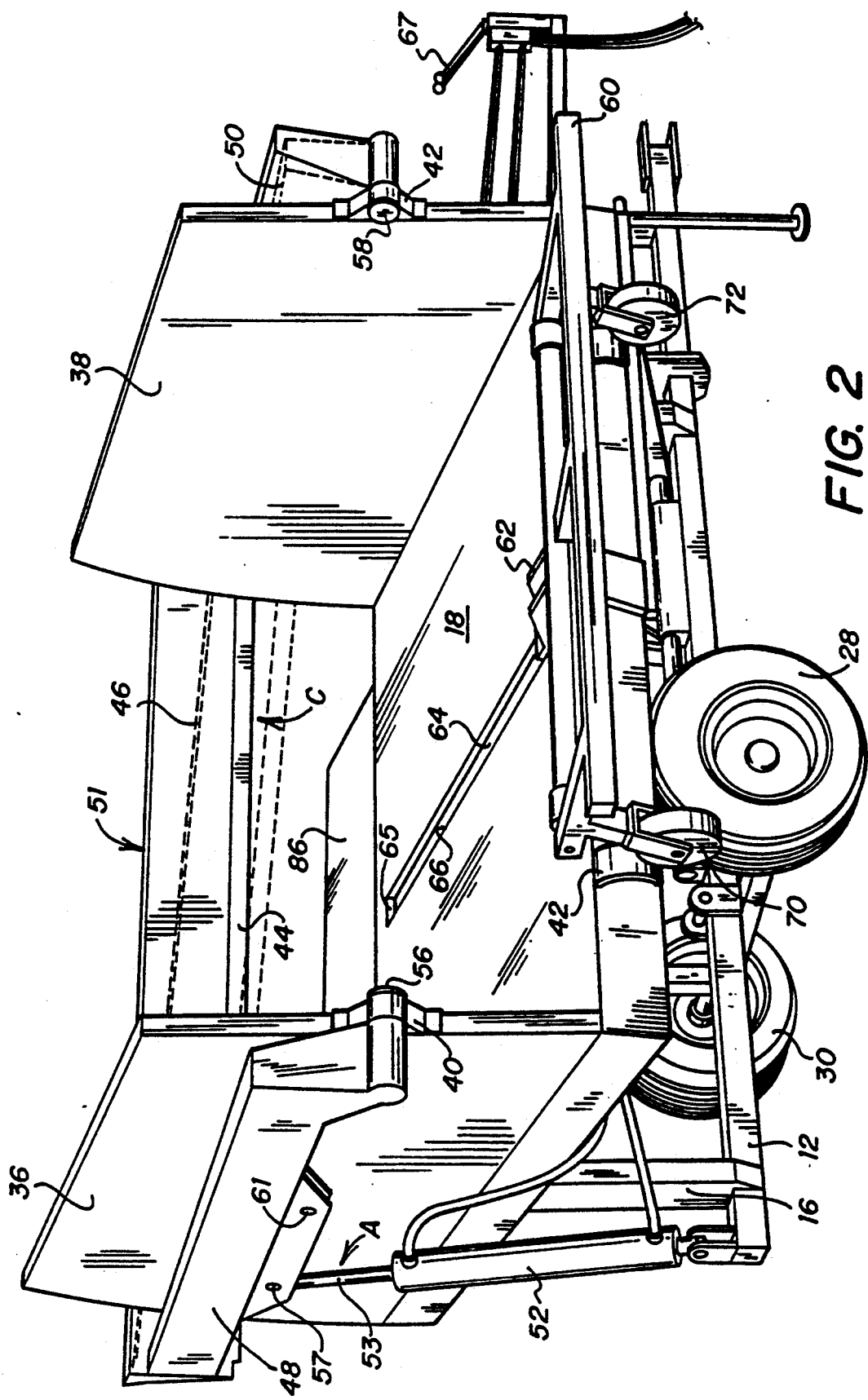
FIG. 2 is a perspective view of the machine showing the bale entrance end am bale pusher.

As best depicted in FIG. 2, side walls 36 and 38 are rigidly connected to the bed 18 for containment of fiber bales and support of knife support beams fulcrum pin balljoints 40 and 42. A cutting blade 44 is mounted to a knife frame 46 that is affixed at its ends to knife support beams 48 and 50 with these parts together comprising a knife 51. Hydraulic cylinders 52 and 54 are each pivotally connected at a lower end to the base support member 12 and operate in parallel to raise and lower the knife by causing oscillating movement of the support beams 48 and 50 about fulcrum pins 56 and 58 in lever fashion. Thus the cutting blade 44 traverses a slightly arced path as shown by the arced ends of bed sidewalls 36 and 38. The arc deviates only a small amount from a straight line so that for all practical purposes consistent with the contemplated use of the machine the blade 44 can be considered as making a straight cut through a bale 84.

Figure 4:
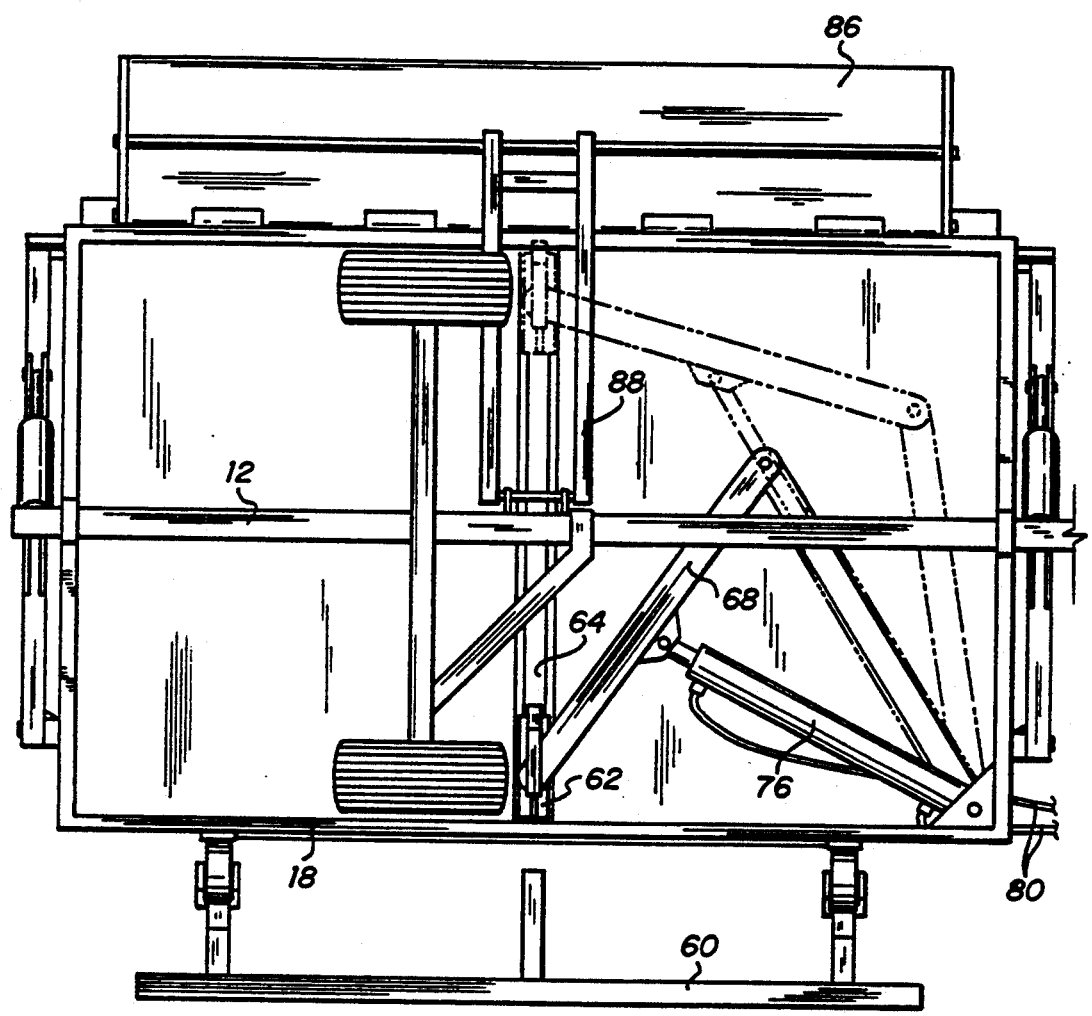
FIG. 4 is a bottom plan view of the machine showing the bale pusher drive cylinder and linkage.

A bale pusher 60 is pivotally mounted on a carrier block 62 slidable on guide beam 64 located parallel to and below the bed slot 66. As shown in FIG. 4 a drive link 68 is pivotally attached to the underside of the carrier block 62. Oscillatory movement of the drive link 68 causes the carrier block 62 to slide on the guide beam 64 along the bed slot 66 with the attached bale pusher 60 supported by the carrier block 62 and two wheels 70 and 72 moving along the length of the bed 18. Movement of the drive link 68 is caused by extension and retraction of the piston rod 74 of a double-acting hydraulic cylinder 76. Straight line movement of the carrier block 62 along the guide beam 64 occurs because the opposed end of drive link 68 is pivotally connected to a swing link 75 that is in turn pivotally connected at an opposed end to the bed structure 18.

Figure 3:
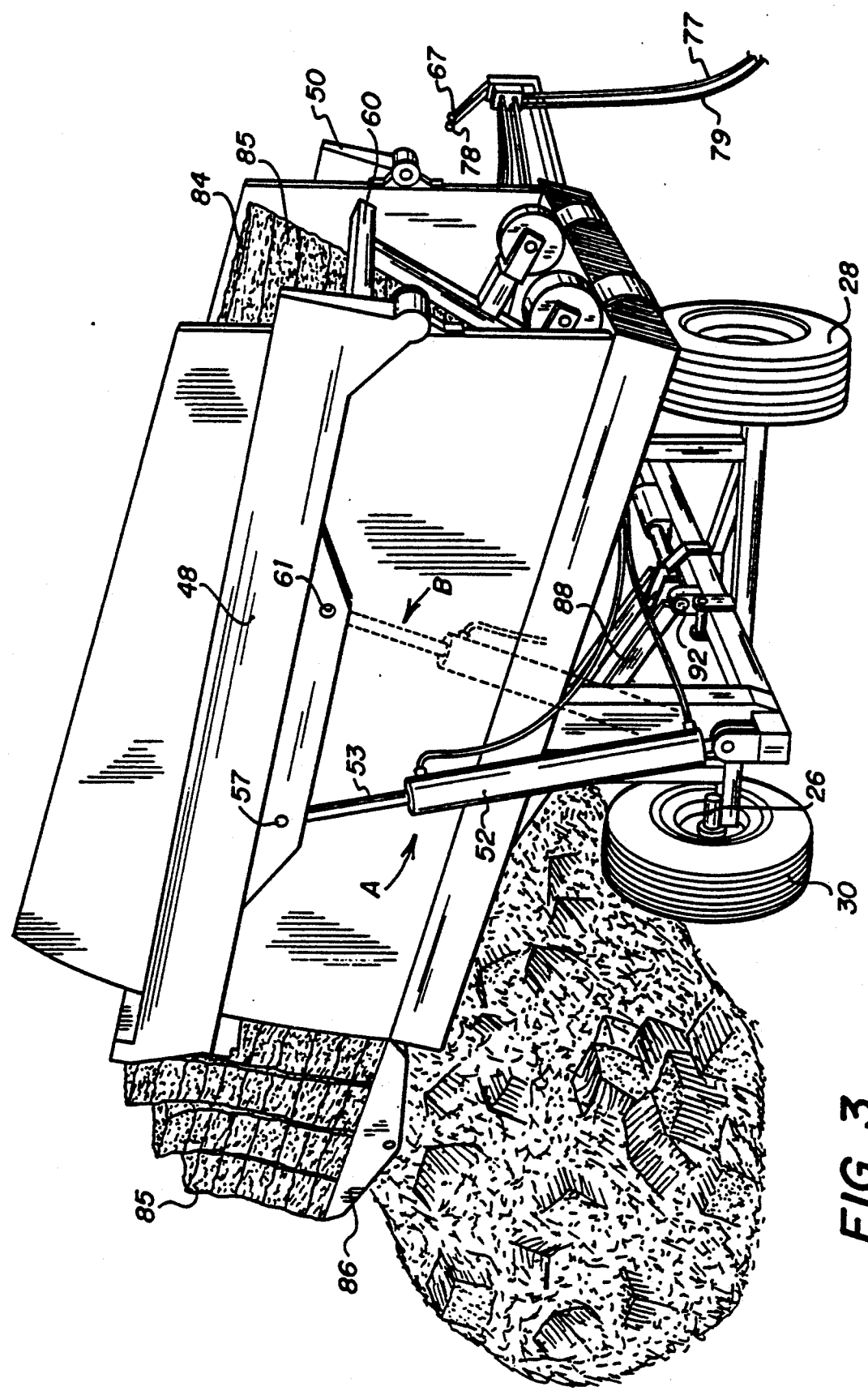
FIG. 3 is a perspective view of the machine from the side opposite the operator control unit side and depicts baled hay being processed in the machine.

Hay (or other fiber) bales 84 are placed on the bed 18 and hydraulic cylinder 76 is actuated by the operator's opening of a control valve 78 to introduce pressurized working fluid to the cylinder 76 through conduit 80 and the resulting movement of the hydraulic cylinder piston rod 74 exerts a force on drive link 68. As the drive link 66 pulls the carrier block 62 along the bed slot 66 the bale pusher 60 is pulled into the bed 18 and tilt wheels 70 and 72 roll upward on curved front bed edge 42 causing the bale pusher 60 to tilt from a horizontal to a vertical position by a cam effect. Any hay bale 84 resting in any part on the pale pusher 60 as it rises from horizontal to vertical is lifted and pushed forward along the bed 18 toward the cutting blade end. As shown in FIG. 3 an operator controlling the flow of pressurized hydraulic oil to the cylinder 76 from control valve 78 determines the extent to which the bale 84 is pushed through the bed 18 under the cutting blade 44 and therefore controls the width of the cut taken through the bale 84. Typical cut widths are three to five inches. Each bale 84 is moved along the bed 18 and cut incrementally until there is sufficient space available in the bed 18 between the bale pusher 60 and the bale being cut to allow introduction of another bale 84. Each new bale 84 then pushes the cut bale through the bed 18 and in turn becomes the cut bale for so long as new bales are available to cut. When the last bale is reached it cannot be pushed entirely through the cutting opening 45 because the carrier block 62 travel is limited by the unslotted end 65 of the bed 18 and underbed structure to which the end of guide beam 64 is affixed. However, the pivotal connection of the bale pusher 60 to the carrier block 62 allows the pusher 60 to be tipped forward to a near horizontal position which places the point of contact between the bale 84 and the leading end of the bale pusher 60 in a vertical plane that also intersects the forward end of the carrier block 62. Thereby the remnant of the cut bale can be incrementally pushed on through the cutting opening 45 and cut to the extent desired.

The operator also controls movement of the cutting blade by controlling flow of hydraulic oil through control valve 67 to cylinders 52 and 54 which pull cutting blade holder 46 and cutting blade 44 through the bale 84. All three hydraulic cylinders exchange pressurized hydraulic oil with an outside source, such as a farm tractor (not shown), through oil supply conduit 77 and return conduit 79, flow control unit 69 and distribution conduits 80. Cylinders 52 and 54 are of the double-acting type to provide for both raising and lowering the knife 51. In position A as shown in FIGS. 1, 2 and 3 the piston rods 53 and 55 are connected to the knife support beams 48 and 50 at pin holes 57 and 59 to utilize the longest available levers associated with fulcrum pins 56 and 58. The longer lever provides a greater cutting force at the knife blade 44 for cutting wet or otherwise tough bales. For ordinary dry bale cutting the shorter lever afforded by connecting piston rods 53 and 55 at pin holes 61 and 63, position B of FIG. 3, results in adequate force while knife 51 movement speed is increased providing for faster bale 84 processing.

Rectangular bales 84 are loaded into the machine 10 so that the compressed layers 85 are cut transversely to maximize the breaking down effect of the cutting process. Cylindrical bales (not shown in drawing) are spirally wound and are essentially cut transversely whichever way they are loaded into the machine 10. Any additional breaking down of the cut pieces desired can easily be accomplished manually. While cylindrical bales are not illustrated in the drawing it should be noted here, and will be obvious to those skilled in the art, that the machine 10 is equally effective for processing cylindrical and rectangular bales.

A discharge chute 86 is provided for collecting and discharging cut hay 85. When the machine 10 is in operation the chute 86 is positioned up and parallel to the bed 18 as shown in FIG. 3. The machine 10 is constructed with the chute end of the bed 18 elevated relative to ground level to provide for collection of the cut hay 85 by a conveyor, trailer, or even from the ground as shown in FIG. 3. The weight of the collected hay 85 on the inclined chute 86 bears against the cut face of the bale 84 thereby facilitating a smooth cut of the next increment after advancement of the bale 84 by providing a back pressure to stabilize the cut face during the new cut. The chute 86 is positioned down or perpendicular to the bed for transporting reasons when the machine 10 is not in operation. A chute arm 88 is pivotally connected to the underside of the chute 86. The chute 86 is raised and lowered by the action of the hydraulic cylinder 76 and carrier block 62 that engages the chute arm 88 to raise the chute 88 prior to introduction of a bale 84 into the machine 10. When the chute reaches the up, parallel to the bed position the operator moves lever arm 90 which causes the free end of chute arm 88 to disengage from the carrier block 62 and drop into a detent 92 on the base support member 12. In this manner the chute 86 is supported in the up position by the chute arm 88 resting in the detent 92 and the carrier block 62 can travel the length of the guide beam 64 without interference from the chute arm 88. Upon completion of bale processing the operator moves the carrier block 62 into position near detent 92 by actuating hydraulic cylinder 76, moves lever arm 90 back to the original position which lifts the free end of chute arm 88 into engagement with the carrier block 62, and actuates hydraulic cylinder 76 to retract the piston rod and thereby lower the chute to the down position. The machine 10 is constructed with the bale pusher end of the bed low relative to ground level to facilitate the introduction of bales into the machine 10 for processing while the chute end is elevated to facilitate removal of cut bale material and to provide the back pressure effect against the cut face of the bale 84 as previously described.

Under wet conditions and/or in the case of tightly compressed irregular materials the resistance of some bales, particularly some parts of some bales, causes the knife to tilt as shown by knife position C of FIG. 2 where the easier cutting on a bale side near cylinder 52 allows greater knife blade penetration than on the opposite side of the bale 84. The tilt causes a flexing of the knife 51 structure that is inherently permissible in the cantilever design and structure of the knife frame 46 and knife support beams 48 and 50 and is further facilitated by the use of ball joints 40 and 42 with the fulcrum pins 56 and 58. The result of such knife tilting is a guillotine (slanted cutting edge) effect of the blade 44 against the material being cut and the resistance is overcome by the slicing action of the blade. The knife 51 then returns to the normal horizontal position that provides adequate cutting force on a typical dry bale and cutting proceeds in a generally level knife fashion until another resistant area causes knife tilting.

Whereas this invention is herein illustrated and described with respect to a particular embodiment, it should be realized that various changes may be made without departing from the essential contributions to the art made by the teachings hereof.

I claim:

1. A bale cutting machine for cutting bales of hay and the like, comprising:

a flat bed having a pair of opposed upright sidewalls, a bed support structure, a bale pusher means for advancing a bale along a longitudinal axis of the bed between the sidewalls from an entry end of the bed to a discharge end of the bed, a bale cutting knife having a sharpened, removable blade affixed in a knife frame positioned at a right angle to a longitudinal axis of the bed and extended over the discharge end of the bed, a first fulcrum pin ball joint mounted on a vertical end surface of a first upright sidewall and a second fulcrum pin ball joint mounted on a vertical end surface of a second upright sidewall with the ball joints having a common longitudinal axis parallel to a flat upper surface of the bed and midway between the bed upper surface and a top of each sidewall at the entry end of the bed, a first knife frame support arm positioned outboard of the first upright sidewall and a second knife frame support arm positioned outboard of the second upright sidewall and parallel to the first knife frame support arm, the first support arm connected at a lower end to the first ball joint by a first fulcrum pin and affixed at an upper end to a first end of the knife, and the second support arm connected at a lower end to the second ball joint by a second fulcrum pin and affixed at an upper end to a second end of the knife for oscillating movement about said first and second fulcrum pins, thereby swinging the knife through an arc from the discharge end bed upper surface to a position above the sidewalls at the discharge end of the bed;

a power means for advancing and retracting the bale pusher along the longitudinal axis of the bed, and a power means for imparting oscillating movement to the knife in an arc about the fulcrum pins.

2. The bale cutting machine of claim 1 wherein the bale pusher is a gate type structure connected to a slidable block arranged for guided reciprocating movement in a channel and on a guide beam extended lengthwise in the bed, the channel being closed at the entry end of the bed and closed at the discharge end of the bed, the slidable block pivotally connected to a first end of a drive link that is pivotally connected at a second end to a first end of a swing link that is pivotally connected at a second end to the bed support structure, the drive link being pivotally connected at an intermediate point to a free end of a piston rod of a double-acting hydraulic cylinder that is pivotally connected at a closed end to the bed support structure proximate the pivotal connection of the swing link to the bed support structure, with the hydraulic cylinder in communication with an external source of pressurized fluid to thereby actuate the hydraulic cylinder to impart reciprocating movement to the bale pusher through the swing link, drive link and slidable block.

3. The bale cutting machine of claim 2 where the bed and bed support structure are canted at an angle of 10 to 45 degrees from a horizontal plane to elevate the discharge end of the bed.

4. The bale cutting machine of claim 3 wherein a chute is hinge connected to the bed at the elevated discharge end and is positionable in a plane with the bed during operation of the bale cutting machine by a support member pivotally connected to an underside of the chute, said support member positionable in a detent of the bed support structure and further positionable into contact with the slidable block for movement by the bale pusher power means so that the chute can be raised to the bed plane position and lowered to a position perpendicular to the plane of the bed.

5. The bale cutting machine of claim 1 wherein the power means for imparting oscillating movement to the knife is a pair of double-acting hydraulic cylinders, a first cylinder of the pair having a piston rod projection pivotally connected to the first support arm between a support arm fulcrum pin end and a support arm knife end and a closed cylinder end pivotally connected to the bed support structure outboard of the first sidewall and a second cylinder of the pair having a piston rod projection pivotally connected to the second support arm between a support arm fulcrum pin end and a support arm knife end and a closed cylinder end pivotally connected to the bed support structure outboard of the second sidewall, with each cylinder connected to an external source of a pressurized fluid through a control means for directing pressurized fluid to either side of a double acting piston of the cylinder to pull the knife down through a hay bale located on the bed and to push the knife up above the top of the hay bale to allow advancement of the bale under the knife for cutting.

6. The bale cutting machine of claim 1 wherein the bed and the bed support structure are mounted on a pair of wheels to form a trailer capable of being pulled from a hitch connection on a bed support member.

7. The method of cutting down compressed bales of hay comprised of loading bales sequentially into a lower end of a bale cutting machine having a canted flat bed and a pair of opposed sidewalls, pushing the bales incrementally through a length of the bed with a hydraulically powered bale pusher, cutting the bales incrementally with a hydraulically powered single-blade knife cantilevered over an elevated discharge end of the bed and discharging cut sections of the bales over a chute extending from the elevated discharge end of the bed.

* * * * *